(12) United States Patent
Barr

(10) Patent No.: US 6,470,733 B1
(45) Date of Patent: Oct. 29, 2002

(54) AUTOMATIC TESTING OF PACKAGE CONTENT AND INTEGRITY

(76) Inventor: Wayne R. Barr, 2390 Golf Vista Blvd., Viera, FL (US) 32955

( * ) Notice: Subject to any disclaimer, the term of this patent is extended or adjusted under 35 U.S.C. 154(b) by 0 days.

(21) Appl. No.: 09/922,474

(22) Filed: Aug. 3, 2001

(51) Int. Cl.⁷ .............................. G01M 3/04; G01M 3/34
(52) U.S. Cl. ......................................... 73/45.4; 73/49.3
(58) Field of Search ........................... 73/45.4, 291, 40, 73/41, 45, 45.1, 45.2, 45.3

(56) References Cited

U.S. PATENT DOCUMENTS

| | | | | |
|---|---|---|---|---|
| 3,683,676 A | * | 8/1972 | Hass ........................... | 73/45.1 |
| 3,751,972 A | * | 8/1973 | Hass ........................... | 73/45.4 |
| 4,602,499 A | * | 7/1986 | Norton et al. .................. | 73/41 |
| 4,649,740 A | | 3/1987 | Franklin ....................... | 73/49.3 |
| 4,706,494 A | | 11/1987 | Creed .......................... | 73/49.3 |
| 4,862,732 A | | 9/1989 | Raymond ....................... | 73/45.4 |
| 4,955,226 A | | 9/1990 | Beaty .......................... | 73/49.3 |
| 5,230,239 A | * | 7/1993 | Gentile ........................ | 73/49.3 |
| 5,259,237 A | | 11/1993 | Aarts .......................... | 73/49.3 |
| 5,533,385 A | * | 7/1996 | Frievalt ....................... | 73/49.3 |
| 5,542,288 A | * | 8/1996 | Fenlon ......................... | 73/49.3 |
| 5,786,530 A | * | 7/1998 | Fenlon ......................... | 73/49.3 |
| 6,202,476 B1 | * | 3/2001 | Fenlon ......................... | 73/49.3 |
| 6,427,524 B1 | * | 8/2002 | Raspante et al. ............. | 73/45.4 |

* cited by examiner

Primary Examiner—Hezron Williams
Assistant Examiner—C D Garber
(74) Attorney, Agent, or Firm—Robert O. Wright

(57) ABSTRACT

A method and apparatus for testing liquid filled plastic vials for quantity of fill and leakage of contents is disclosed. Packets of six vials are tested in first and second test stations. The first station control program prevents second station testing of "solid" vials that would damage the second test station force measuring load cells. Vials testing outside of predetermined limits cause the packet to be classified as a reject.

17 Claims, 5 Drawing Sheets

AUTOMATIC TESTING OF PACKAGE CONTENT AND INTEGRITY

This invention relates to testing of liquid containing plastic containers for content and integrity and more particularly to the automatic testing of plastic vials filled with liquid.

BACKGROUND OF THE INVENTION

Testing of sealed packages containing various items has been done for many years. Depending on the product and type of package, various systems have been used to be sure the package integrity has not been breached. Testing for leaks of plastic bags of food items such as potato chips has been done by applying a weight to the bag and measuring the resulting thickness. (U.S. Pat. No. 4,649,740 to Franklin) Flexible packages have also been tested for leaks by applying a ram at a fixed pressure to a package on a scale and noting any change in reading over time (U.S. Pat. No. 5,259,237 to Aarts). Raymond in U.S. Pat. No. 4,862,732 applies a force with a strain gauge and measures the rate of change of the applied force to determine a leak.

OBJECTS AND SUMMARY OF THE INVENTION

After a gross go-no-go test to reject obvious out of tolerance specimens that could damage the actual test apparatus, the present invention subjects a plurality of specimens individually and simultaneously to a predetermined force via strain gauge modules, measures the resistance of the force application at two different times and accepts or rejects the entire plurality of specimens based on a comparison of the measured forces and a predetermined set of values.

Accordingly it is an object of the present invention to provide an apparatus and method for testing simultaneously a plurality of individual liquid containing plastic vials for proper volume content and leakage of fluid therefrom.

It is a further object of the present invention to provide an apparatus and method for automatically testing liquid filled plastic vials as they come off a production line, reject defective vials, and deliver accepted vials to a packaging system.

It is a still further object of the present invention to provide an apparatus and method for simultaneously and automatically testing each individual, vial in a group of two or more liquid filled plastic vials as they travel along a production line.

These and other and further objects of the present invention are achieved with an apparatus for testing liquid filled vials coming off a production line for proper amount of filling and sealing of the vial which places a packet of six vials in a first test station and applies a force to each individual vial simultaneously, measures the amount of force applied, classifies the entire packet a reject if the force applied to a selected number of vials falls outside a predetermined range, transfers each packet to another test station and disables the test station if the packet has been classified reject or applies another force to each vial simultaneously, measures the force applied to each vial, at two different times, compares the two force applications and classifies the entire packet a reject if the measured force applied to any one vial is outside a predetermined value.

DESCRIPTION OF A PREFERRED EMBODIMENT

Figure 1:
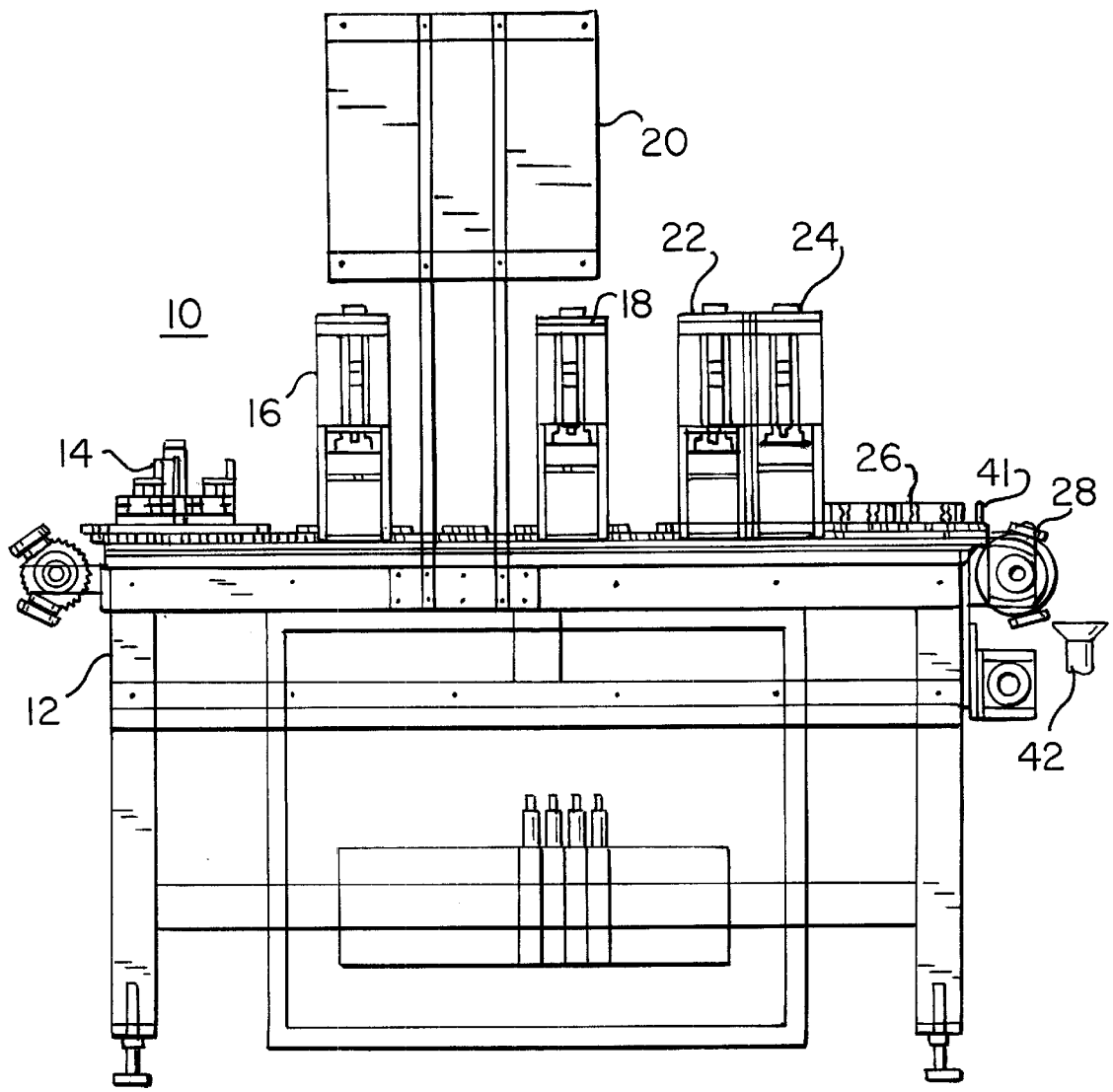
FIG. 1 is a schematic side elevation of a machine according to the present invention.
Figure 2:
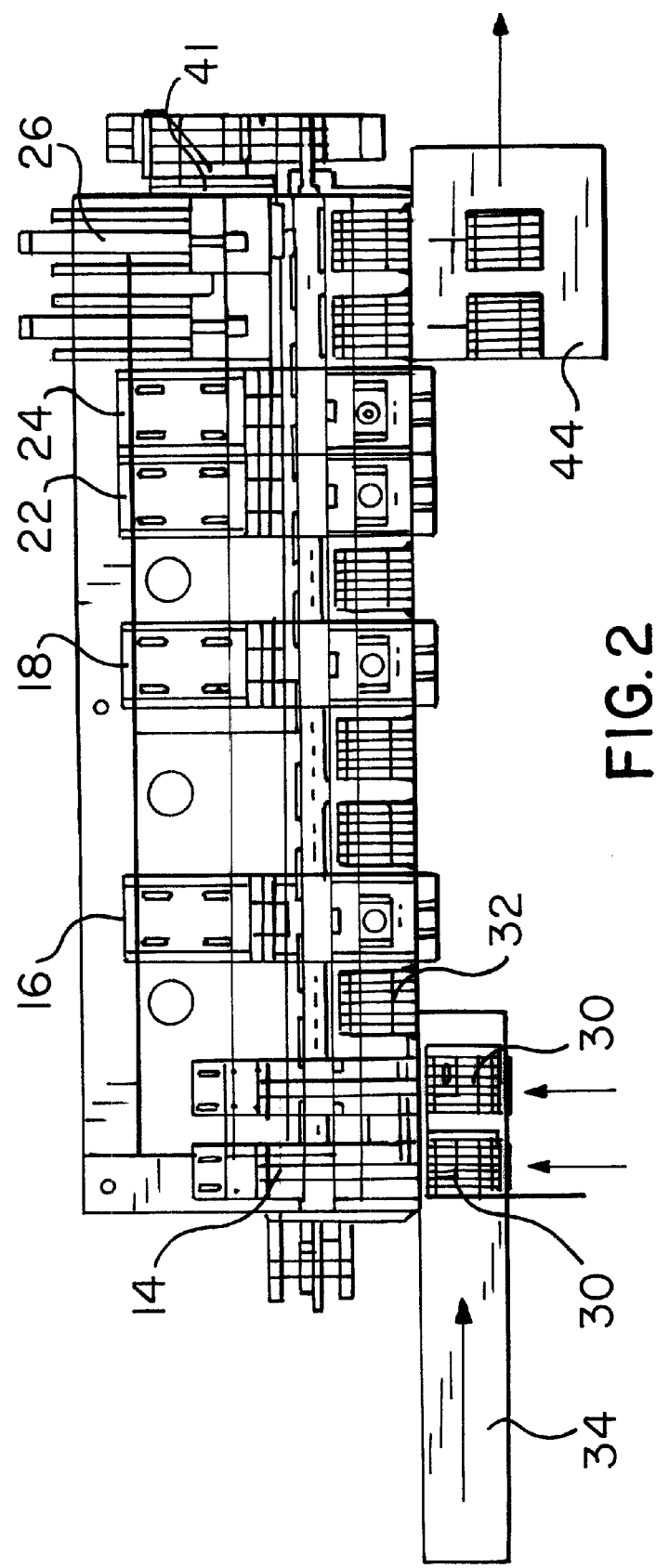
FIG. 2 is a schematic top plan view of the machine of FIG. 1.

Referring now to FIG. 1 the test machine 10 has a main frame 12 on which are mounted an input transfer mechanism 14, pretest fixtures 16 and 18, controller 20, test stations 22 and 24, discharge transfer mechanism 26, and indexing belt 28 (see FIG. 2 also). Detailed drawings of the usual power, drive, control and computer systems are omitted for the sake of clarity.

Figure 3:
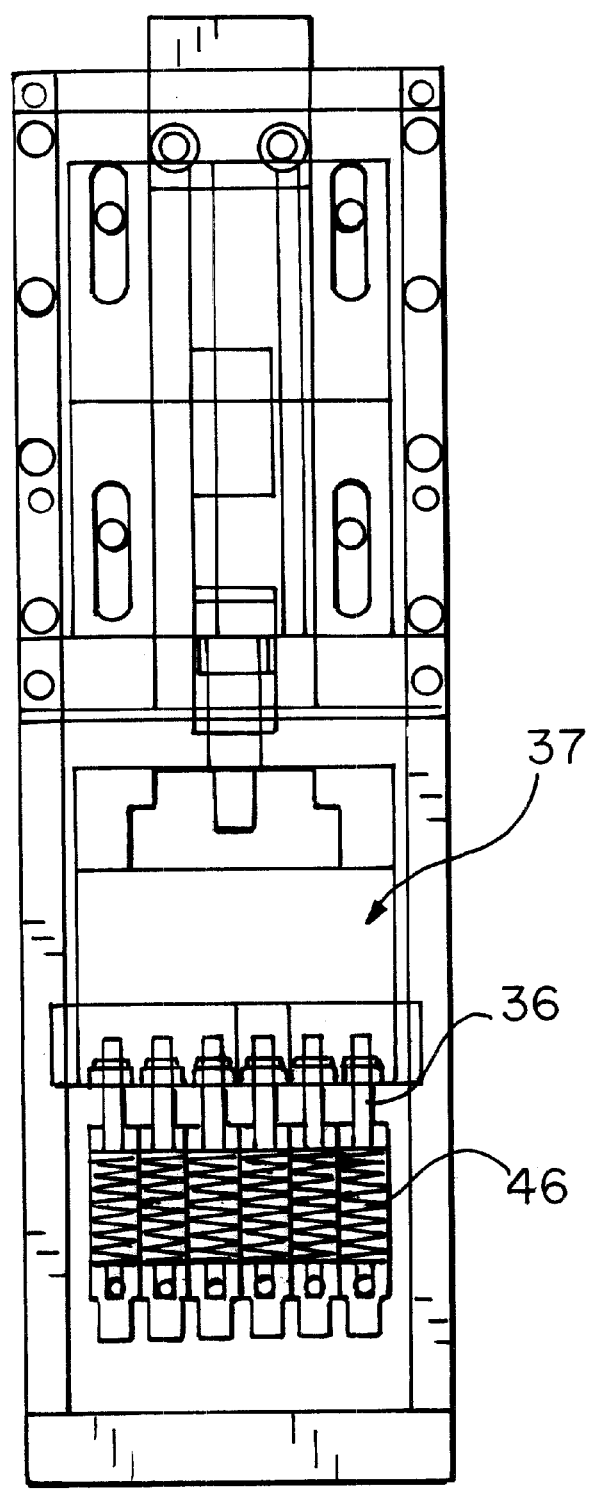
FIG. 3 is a side elevation of the force applying head of the first test station of FIG. 1 with covers broken away for clarity.

Referring now to FIG. 2 in operation packets 30 consisting of six individual plastic vials 32 frangibly held together by interconnecting tabs, are placed at spaced intervals on input conveyor 34. Packets 30 may be fed to machine 10 individually or in pairs as desired. As the packets 30 arrive in front of transfer mechanism 14 they are laterally transferred to indexing belt 28. On the first index of belt 28 a packet is positioned in pretest fixture 16. As may be seen in FIG. 3 fixture 16 has six individual fingers 36 mounted on an air actuated ram 37 and spring urged downward against a stop by springs 46. After indexing, the controller for the machine will cause the ram 37 to move the fingers 36 into contact with the individual vials 32. Springs 46 are adjusted to exert a force sufficient to dimple the individual vials 32 if the vials have been filled with the proper amount of fluid. If a vial has been overfilled or if the molding machine malfunctioned and the vial is solid plastic the appropriate individual finger 36 will not be able to indent the vial and it will extend upward from the others and actuate a sensor signaling the controller that this packet is classified as a reject. This also will also cause the controller to instruct the appropriate test station not to try to test this packet. Damage to the test station strain gauges is thus prevented.

Figure 4:
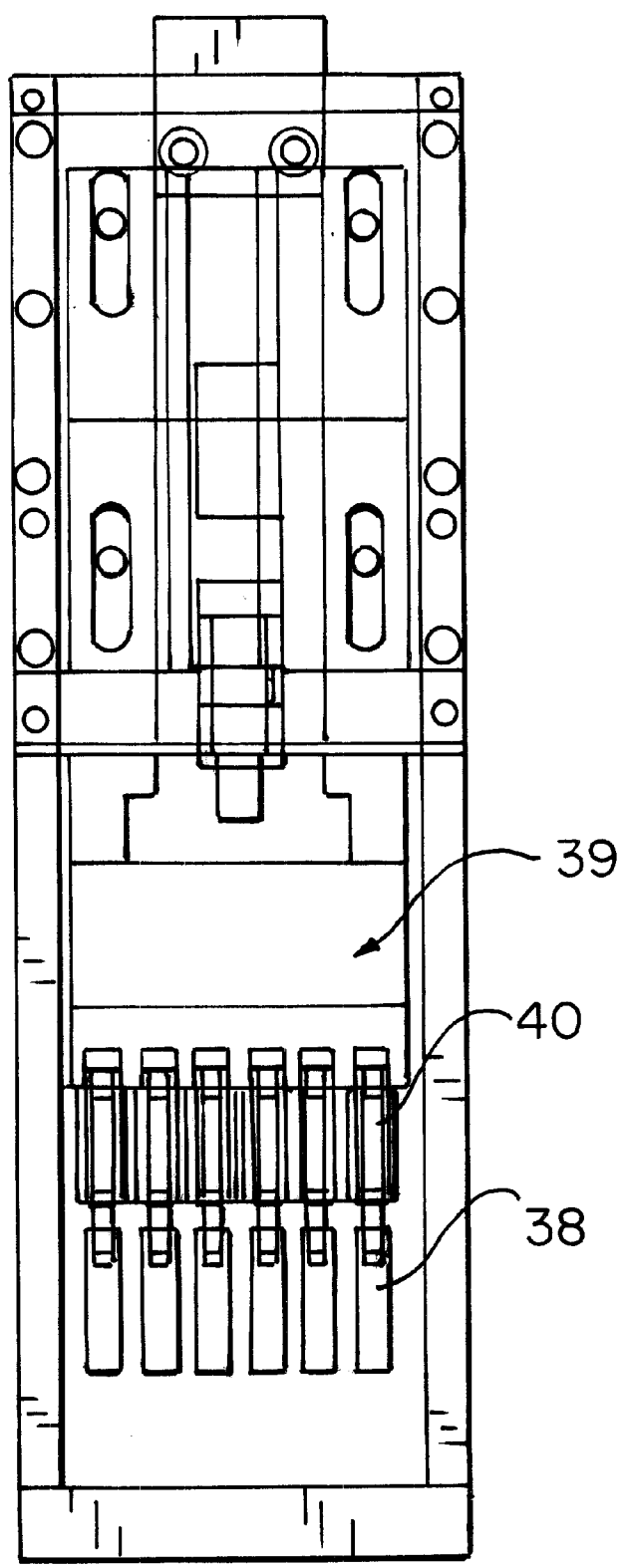
FIG. 4 is a view similar to FIG. 3 of a second test station also with covers broken away for clarity.

If the packet 30 in the pretest station 16 is classified as acceptable, indexing belt 28 will transport packet 30 to the appropriate test station 24 and signal the machine to begin the test program. Test stations 22 and 24 each have six fingers 38 (see FIG. 4) which are connected to an air actuated ram 39 via six strain gauges 40. After the ram lowers the strain gauges 40 to a predetermined position applying the desired force to the packet vials, the controller program will take a series of readings of each strain gauge 40 as indicated in detail herein. If any one of the strain gauge readings is outside the assigned tolerance limits, the entire packet will be classified as a reject and the controller will keep track of the packet 30 and cause it to be ejected from the machine at the end of the cycle by discharge through gate 41 and chute 42 at the end of belt 28. If the packet 30 is classified as acceptable, indexing belt 28 will move the packet to discharge transfer mechanism 26 which will move packet 30 off of belt 28 and onto a packaging conveyor 44 for transport to a packaging machine. During this testing and classification program, the test station 24 ram 39 will remain in the down position maintaining the fingers 38 and strain gauges 40 in contact with the vials 32 until the desired series of readings may be taken if so indicated.

Figure 5:
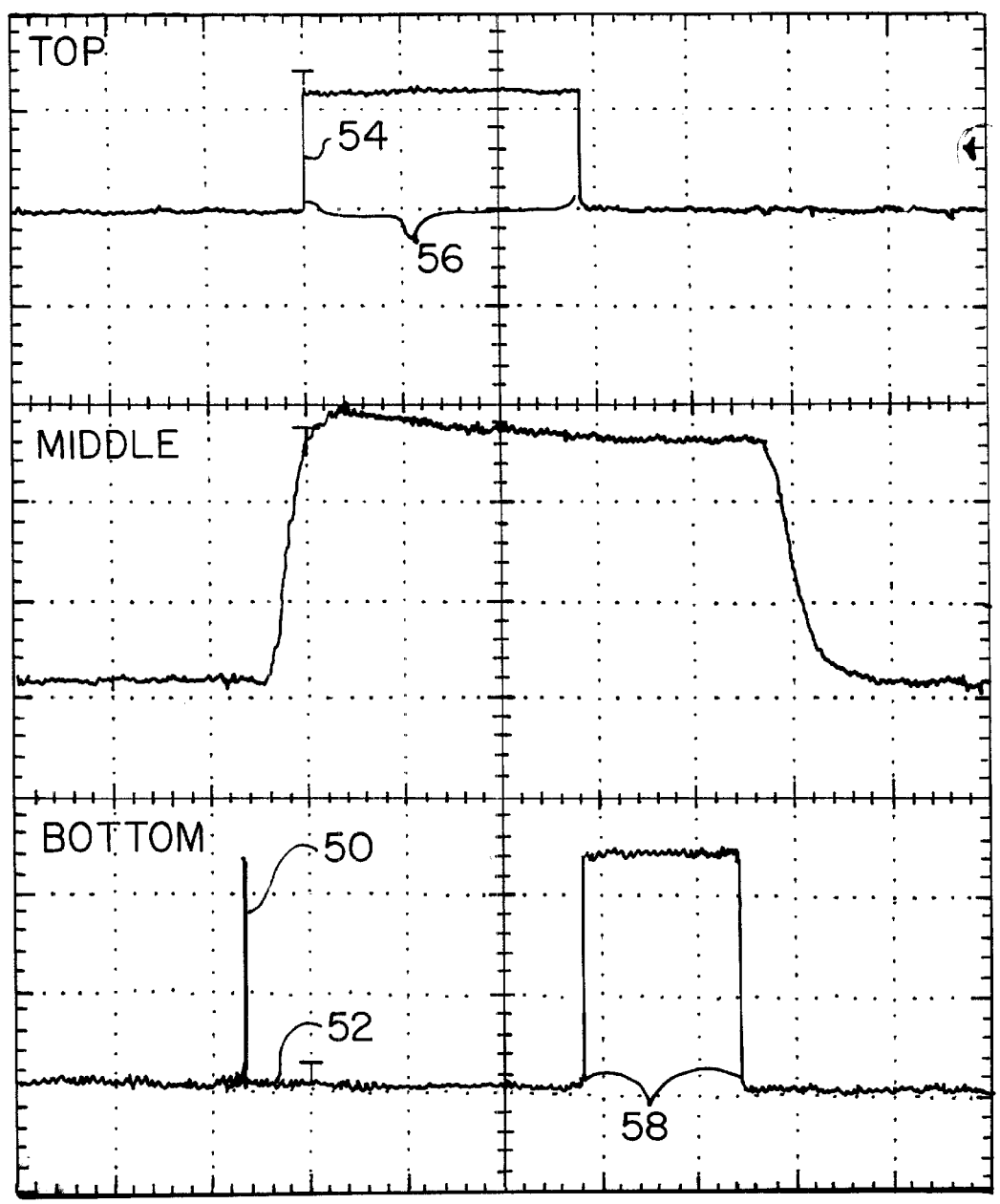
FIG. 5 is a graphic representation of the testing protocol comparing the measurements of the first and second force measurements at the second test stations.

Referring now to FIG. 5 there is shown graphically a sequence of testing and limits at which decisions are made by the controller as to acceptance or rejection of a packet 30. The sequence starts with a rezero pulse 50 (bottom panel). A short delay 52 allows the loading of the strain gauges 40 (shown graphically in the middle panel) and after this delay 52 the timer is started at 54 (top panel). After a delay 56 of a few hundred milliseconds a strain gauge reading is taken. The timer is restarted and after another delay 58 of a few hundred milliseconds a second reading is taken. The two readings are then compared and if the readings are within acceptable limits the packet is classified as good and the machine cycle continued. If the first reading is outside the preset limits the controller will classify the packet as bad. If the first reading is good but the second reading is outside of acceptable limits the controller will classify the packet as bad. If the difference between the first and second readings exceeds a preset delta the controller will classify the packet as bad and mark it for rejection at the end of the indexing belt. If all readings are within limits the packet is classified as good.

In one particular application if the first limits were set between 600 and 1200 and the first reading was 900 a second reading would be taken. If the second reading limits were 550 to 1500 and the reading was 870 the packet will be classified as good. In addition to minimum and maximum limits, a delta difference may be used to further ensure accurate testing. Thus we might say the second reading had to be less than forty points less and no more than 100 points greater. The 870 accordingly is acceptable. Similarly, a first reading of 620 and a second reading of 570 would indicate a bad packet because the delta was greater than 40. Obviously a first reading of 550 would classify the packet as bad without further testing.

As may be seen, limits for each reading may be set in accordance with the requirements of the product being packaged and tested. Every individual vial is tested and if any one vial is out of tolerance the entire packet is classified a reject for further processing. This particular embodiment shows packets having six individual vials. Various other packets from two to twelve may be utilized as required. Packets having obviously defective vials are immediately identified so as to protect the rest of the machine and otherwise acceptable packets have all vials tested to as tight tolerances as needed in a fast and efficient manner.

Referring again to FIG. 1 the preceding description has dealt with only one packet at a time. In order to facilitate large scale production, two pretest stations 16 and 18 and two final test stations 22 and 24 are provided. Thus when as shown in FIG. 2, two packets 30 are transferred simultaneously from conveyor 34 to indexing belt 28 the right hand packet 30 in FIG. 2 is indexed on the first index motion under pretest station 16 which processes the packet as described above. On the third index motion the left hand packet 30 is positioned under pretest station 18 for similar processing. On the fourth index motion the right hand packet 30 is positioned under final test station 24 and the left hand packet 30 is positioned under final test station 22 for simultaneously testing as described above. The fifth index motion positions both packets 30 in the output transfer station 26 for either transfer to the packaging conveyor 44 or discharge through chute 42 depending on whether they were classified as rejects or acceptable by test stations 22 and 24.

While there are given above certain specific examples of this invention and its application in practical use, it should be understood that they are not intended to be exhaustive or to be limiting of the invention. On the contrary, these illustrations and explanations herein are given in order to acquaint others skilled in the art with this invention and the principles thereof and a suitable manner of its application in practical use.

I claim:

1. Apparatus for simultaneously testing for proper filling of and leaks in, a plurality of liquid filled deformable vials which comprises:

a first test station for receiving a preselected quantity of vials;

a first quantity of force applying members, at least equal to the quantity of vials to be tested;

means for detecting displacement of any of said force applying members beyond preset limits and classifying said quantity of vials as a reject upon detecting said displacement;

a second test station for receiving said preselected quantity of vials;

a second quantity of force applying members, at least equal to the quantity of vials to be tested;

means for measuring, recording and storing the force applied by each of said second quantity of force applying members a first time;

means for measuring, recording and storing a second separate time, the force applied by each of said second quantity of force applying members;

controller means for comparing to a set of predetermined values; said first and second force measurements applied by said second quantity of force applying members;

second means for classifying said entire preselected quantity of vials as a reject if any of said force measurements fall outside said predetermined limits when compared with said recorded and stored measurements; and means for rejecting said entire preselected quantity of vials when any one vial of said preselected quantity is classified as a rejects in said first or second test stations.

2. Apparatus as claimed in claim 1 wherein said quantity of vials to be tested is a packet of between two and twelve vials.

3. Apparatus as claimed in claim 2 wherein said quantity of vials is a packet of six vials.

4. Apparatus as claimed in claim 1 wherein said first quantity of force applying members are springs and said second quantity of force applying members are force measuring devices.

5. Apparatus as claimed in claim 1 wherein said first quantity of force applying members are springs and said second quantity of force applying members are strain gauge load cells.

6. Apparatus as claimed in claim 5 wherein said quantity of vials is a packet of six and said strain gauge load cells are grouped in packets of six so as to individually apply the same force load to each vial to be tested.

7. Apparatus as claimed in claim 1 further including an indexing belt to transport vials to be tested from station to station; and ejection means for removing packets classified as rejects in either said first or second test stations when the measured force displacements or loads fall outside preselected values.

8. Apparatus as claimed in claim 7 wherein said first and second test stations are spaced apart along said indexing belt a distance sufficient to allow testing of multiple quantities of vials.

9. Apparatus as claimed in claim 1 wherein acceptable vials will be deformed a predetermined amount by application of said force, and electronic sensor means operatively positioned adjacent said force applying members whereby when a solid plastic filled or fluid totally filled vial is encountered the corresponding force applying member cannot deform the vial and therefore actuates said sensor means.

10. Apparatus as claimed in claim 7 further including two first test stations at spaced intervals along said indexing belt and a pair of second test stations spaced down stream of said first test stations along said indexing belt.

11. Apparatus as claimed in claim 10 further including a first moving conveyor running generally parallel to but spaced from said indexing belt;

a second moving conveyor running generally parallel to but spaced from said indexing belt and said first conveyor;

a transfer mechanism for moving said quantity of vials from said first conveyor to said indexing belt;

a second transfer mechanism positioned at the end of said indexing belt to transfer accepted quantities of vials to said second conveyor; and gate means for permitting rejected quantities of vials to be displaced into a scrap bin by said indexing belt.

12. Apparatus as claimed in claim 1 further including program control means for preventing application of said second forces at said second test station to a quantity of vials classified as a reject when an out of preset limits displacement of a force applying member is detected at said first test station.

13. A method of simultaneously testing a plurality of liquid filled plastic vials for proper content and leakage which comprises:

placing a quantity of vials on a first test station base;

simultaneously applying an equal force individually to each of said quantity of vials in said first test station;

detecting any variation in resistance to the force applied to each individual vial of said quantity of vials relative to the other vials;

classifying as a reject all of said quantity of vials if a selected number of vials show a resistance outside of preselected limits;

placing said quantities of vials on a second test station base;

applying a second equal force individually and simultaneously to each of said quantity of vials if said quantity is classified acceptable at said first test station;

measuring said second force applied to each individual vial a first time;

classifying as a reject said quantity of vials if at least one vial measures outside of preset limits;

measuring said second force then again a second time if said quantity is classified acceptable;

measuring and recording the force applied to each of said quantity of vials at said first and second spaced apart times;

comparing said first and second sets of force measurements for each of said quantity of vials;

classifying as rejects all quantities of vials where at least one of said vials compared applied force measurements fall outside of preset limits;

ejecting said entire quantity of vials of all quantities classified as rejects.

14. The method as claimed in claim 13 further including forming said plurality of vials into packets of from two to twelve each for testing.

15. The method as claimed in claim 14 further including forming said plurality of vials into packets of six each for testing.

16. The method as claimed in claim 13 further including setting a first set of acceptable limits for the second force first time application and a separate setting of acceptable limits for the second force second time application.

17. The method as claimed in claim 13 further including when a reject is classified at said first test station, preventing the application of said second force at said second test station both first and second times to said preselected quantity of vials having at least one outside of preselected limits vial.

* * * * *